(12) United States Patent
Klassen et al.

(10) Patent No.: US 9,325,643 B2
(45) Date of Patent: *Apr. 26, 2016

(54) HANDHELD ELECTRONIC DEVICE AND ASSOCIATED METHOD PROVIDING TIME DATA IN A MESSAGING ENVIRONMENT

(75) Inventors: Gerhard D. Klassen, Waterloo (CA); Christopher R. Wormald, Kitchener (CA); Lawrence E. Kuhl, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 889 days.

This patent is subject to a terminal disclaimer.

(21) Appl. No.: 13/111,706

(22) Filed: May 19, 2011

(65) Prior Publication Data

US 2011/0219088 A1 Sep. 8, 2011

Related U.S. Application Data

(63) Continuation of application No. 10/944,925, filed on Sep. 20, 2004, now Pat. No. 7,970,849.

(60) Provisional application No. 60/504,379, filed on Sep. 19, 2003.

(51) Int. Cl.
| | | |
|---|---|---|
| H04L 12/58 | (2006.01) | |
| G06F 15/02 | (2006.01) | |
| H04M 1/725 | (2006.01) | |

(52) U.S. Cl.
CPC ............... *H04L 51/04* (2013.01); *G06F 15/02* (2013.01); *H04L 12/581* (2013.01); *H04L 12/5895* (2013.01); *H04L 51/38* (2013.01); *H04M 1/72552* (2013.01)

(58) Field of Classification Search
CPC ... G06F 15/02; H04L 12/581; H04L 12/5895; H04L 51/04; H04L 51/38; H04M 1/72552
USPC .................................................. 709/206, 207
See application file for complete search history.

(56) References Cited

U.S. PATENT DOCUMENTS

| | | |
|---|---|---|
| 6,301,609 B1 | 10/2001 | Aravamudan et al. |
| 6,484,196 B1 | 11/2002 | Maurille |

(Continued)

FOREIGN PATENT DOCUMENTS

| | | |
|---|---|---|
| CA | 2475319 A1 | 8/2003 |
| EP | 0743762 A2 | 11/1996 |

(Continued)

OTHER PUBLICATIONS

Lastoria, Gianluca; Search Report from corresponding European Application No. 10172832.7; search completed Oct. 1, 2010.

(Continued)

*Primary Examiner* — Michael C Lai
(74) *Attorney, Agent, or Firm* — Donna Flores; Fleit Gibbons Gutman Bongini & Bianco P.L.

(57) ABSTRACT

An improved handheld electronic device and an associated method are provided in which time data regarding certain aspects of a messaging conversation on a handheld electronic device are made available to a user. Such time data is provided, for instance, in situations where an interruption has occurred during a messaging conversation. Time data can also be provided to a user on demand in certain circumstances.

51 Claims, 7 Drawing Sheets

(56) References Cited

U.S. PATENT DOCUMENTS

| | | | |
|---|---|---|---|
| 6,590,529 B2 | 7/2003 | Schwoegler et al. | |
| 6,636,243 B1 * | 10/2003 | MacPhail | 715/772 |
| 6,889,063 B2 * | 5/2005 | Yamada | 455/567 |
| 7,043,530 B2 | 5/2006 | Isaacs et al. | |
| 7,099,700 B2 * | 8/2006 | Hwang et al. | 455/566 |
| 7,111,044 B2 * | 9/2006 | Lee | 709/204 |
| 7,181,497 B1 * | 2/2007 | Appelman et al. | 709/206 |
| 7,236,472 B2 | 6/2007 | Lazaridis et al. | |
| 7,305,441 B2 * | 12/2007 | Mathewson et al. | 709/206 |
| 7,917,483 B2 * | 3/2011 | Chang | 707/705 |
| 2002/0075303 A1 | 6/2002 | Thompson et al. | |
| 2002/0087649 A1 | 7/2002 | Horvitz | |
| 2003/0001890 A1 | 1/2003 | Brin | |
| 2003/0060240 A1 | 3/2003 | Graham et al. | |
| 2003/0104841 A1 | 6/2003 | Yamamoto | |
| 2004/0137967 A1 | 7/2004 | Bodley et al. | |
| 2004/0228531 A1 | 11/2004 | Fernandez et al. | |
| 2008/0012839 A1 * | 1/2008 | Feague et al. | 345/179 |

FOREIGN PATENT DOCUMENTS

| | | | | |
|---|---|---|---|---|
| EP | 1176840 A1 | 1/2002 | | |
| GB | 2 350 746 | * | 12/2000 | G06F 13/00 |
| GB | 2350746 A | 12/2000 | | |
| GB | 2384150 A | 7/2003 | | |
| JP | 200311145 A | 12/1990 | | |
| WO | WO 01/30091 A1 | 4/2001 | | |
| WO | WO 02/21413 A2 | 3/2002 | | |
| WO | WO 02/065250 A2 | 8/2002 | | |
| WO | WO 2004/064362 A1 | 7/2004 | | |

OTHER PUBLICATIONS

Varma, S.; Search Report from corresponding PCT Application No. PCT/CA2004/001712; search completed Dec. 1, 2004.

* cited by examiner

FIG. 4

> Hi Honey, how was your day?
< Brutal! Larry embarrassed me in front of everybody.
> What a Jerk!
< Yeah, but I got him back later with a karate chop! ☺
   2:44 pm
> good for you

FIG. 5

> Hi Honey, how was your day?
< Brutal! Larry embarrassed me in front of everybody.
> What a Jerk!
< Yeah, but I got him back later with a karate chop! ☺
   2:44 pm
> good for you
   4:56 pm
> Hey, want to go out tonight?

> Hi Honey, how was your day?
< Brutal! Larry embarrassed me in front of everybody.
> What a Jerk!
< Yeah, but I got him back later with a karate chop! ☺
> Hey, want to go out tonight? —180
         188    2:44 pm —184
          /     4:56 pm —192
< Sure, sounds fun.
> Great, I'LL pick you up in an hour.
< Can't wait

FIG. 7

> Hi Honey, how was your day?
< Brutal! Larry embarrassed me in front of everybody.
> What a Jerk! /282
284— < Yeah, but I got him back later with a karate chop! ☺
> —[2:44 pm] 'Hey, want to go out tonight?—286
292— < —[4:56 pm] Sure, sounds fun.—294     —280
> Great, I'LL pick you up in an hour.
< Can't wait  290      —288

FIG.8a

> Hi Honey, how was your day?
< Brutal! Larry embarrassed me in front of everybody.
> What a Jerk!  /280  /286
282— < Yeah, but I got him back later with a karate chop! ☺
> —Hey, want to go out tonight? [2:44 pm]—284
292— <—[4:56 pm] Sure, sounds fun.—294
> Great, I'LL pick you up in an hour.
< Can't wait  290      288

FIG.8b

> Hi Honey, how was your day?
< Brutal! Larry embarrassed me in front of everybody.
> What a Jerk!
< Yeah, but I got him back later with a karate chop! ☺
> Hey, want to go out tonight? ─── 2:44 pm
< Sure, sounds fun.
> Great, I'LL pick you up in an hour.
< Can't wait

*FIG.9*

> Hi Honey, how was your day?
< Brutal! Larry embarrassed me in front of everybody.
> What a Jerk!
< Yeah, but I got him back later with a karate chop! ☺
> Hey, want to go out tonight?
< Sure, sounds fun.
> Great, I'LL pick you up in an hour.
< Can't wait ─── LESS THAN ONE MINUTE AGO

*FIG.10*

HANDHELD ELECTRONIC DEVICE AND ASSOCIATED METHOD PROVIDING TIME DATA IN A MESSAGING ENVIRONMENT

CROSS REFERENCE TO RELATED APPLICATIONS

This application is a continuation of U.S. patent application Ser. No. 10/944,925 filed on Sep. 20, 2004 (now U.S. Pat. No. 7,970,849), which claims the benefit of U.S. Provisional Application No. 60/504,379 entitled filed on Sep. 19, 2003, both of which are hereby incorporated into the present application by reference.

BACKGROUND OF THE INVENTION

1. Field of the Invention

The invention relates generally to handheld electronic devices and, more particularly, to a handheld electronic device and a method for providing information representative of the times of certain communications in a messaging environment.

2. Background of the Invention

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable, and thus are relatively small. Many handheld electronic devices also feature wireless communication capability, although many such handheld electronic devices are stand-alone devices that are functional without communication with other devices. With advances in technology, handheld electronic devices are being configured to include greater numbers of features while having relatively smaller form factors.

Electronic devices, including handheld electronic devices, are capable of numerous types of communication. One type of communication is "messaging", and one type of messaging is "instant messaging" which enables a first device to send a message on a more or less instantaneous basis to a second device. With most all instant messaging, a given electronic device is provided with an interface that outputs the various communications that have occurred between the electronic device and another electronic device during a messaging "conversation". A sample output on an electronic device that is representative of the various communications that have occurred during a conversation may be as follows:

Hi Honey, how was your day?
<Brutal! Larry embarrassed me in front of everybody. What a Jerk!
<Yeah, but I got him back later with a karate chop! ☺
good for you.

In this example, incoming messages are indicated by a greater than ">" mathematical symbol, and outgoing messages are indicated by a less than "<" mathematical symbol. If the conversation continues quickly, i.e., substantially without interruption, the messages do not need a time stamp on them. In the environment of a handheld electronic device, it would be desirable to avoid unnecessary time stamps and other unnecessary output since it occupies too much valuable space on the limited display of the handheld electronic device.

In some messaging circumstances, however, it may be desirable for information regarding certain timing aspects of conversation to be available to a user. Nevertheless, the limited space available on a display of a handheld electronic device has made a solution difficult. It thus would be desirable to provide an improved handheld electronic device and an associated method that provide time data in a messaging environment.

SUMMARY OF THE INVENTION

An improved handheld electronic device and an associated method are provided in which time data regarding certain aspects of a messaging conversation on a handheld electronic device are made available to a user. Such time data is provided, for instance, in situations where an interruption has occurred during a messaging conversation. Time data can also be provided to a user on demand in certain circumstances.

Accordingly, an aspect of the invention is to provide an improved handheld electronic device and a method in which data regarding the times at which certain communications have occurred in a messaging environment are made available to a user.

Another aspect of the invention is to provide an improved handheld electronic device and a method that enables a user to be made aware of certain timing aspects of a conversation in a messaging environment.

Another aspect of the invention is to provide an improved handheld electronic device and a method in which data regarding the times at which certain communications have occurred are made available to a user while limiting the amount of display area that is occupied by such data.

Another aspect of the invention is to provide an improved handheld electronic device and a method in which data can be provided regarding the elapsed time since a communication.

Accordingly, an aspect of the invention is to provide an improved method of providing an output on at least one of a first electronic device and a second electronic device, with the first electronic device being adapted to be in electronic communication with a second electronic device. The general nature of the method can be stated as including determining that a first messaging communication has occurred at a first time between the first device and the second device, outputting a first indication that is representative of at least a portion of the first communication, determining that a predetermined period of time has elapsed since the first time substantially without further communication between the first device and the second device and, responsive to determining that a predetermined period of time has elapsed, outputting a first time stamp representative of the first time.

Another aspect of the invention is to provide an improved method of providing an output on at least one of a first electronic device and a second electronic device, with the first electronic device being adapted to be in electronic communication with a second electronic device. The general nature of the method can be stated as including determining that a first messaging communication has occurred at a first time between the first device and the second device, outputting a first indication that is representative of at least a portion of the first communication, detecting a predetermined input and, responsive to detecting a predetermined input, outputting a first time stamp representative of the first time.

Another aspect of the invention is to provide an improved method of providing an output on at least one of a first electronic device and a second electronic device, with the first electronic device being adapted to be in electronic communication with a second electronic device. The general nature of the method can be stated as including determining that a first messaging communication has occurred at a first time between the first device and the second device, outputting a first indication that is representative of at least a portion of the first communication, determining that a first period of time has elapsed since the first time substantially without further communication between the first device and the second device and, responsive to determining that a first period of time has elapsed, outputting a first time stamp representative of the first period of time.

Another aspect of the invention is to provide an improved handheld electronic device of a type that is adapted to be in electronic communication with another electronic device. The general nature of the handheld electronic device can be stated as including a processor apparatus, an input apparatus, and an output apparatus. The processor apparatus includes a processor and a memory and is adapted to receive input from the input apparatus and to provide output to the output apparatus. The processor apparatus also is adapted to determine that a first messaging communication has occurred at a first time between the handheld electronic device and the other electronic device. The output apparatus is adapted to output a first indication that is representative of at least a portion of the first communication. The processor apparatus is adapted to determine that a predetermined period of time has elapsed since the first time substantially without further communication between the handheld electronic device and the other electronic device. Responsive to a determination that a predetermined period of time has elapsed, the output apparatus is adapted to output a first time stamp representative of the first time.

BRIEF DESCRIPTION OF THE DRAWINGS

A full understanding of the invention can be gained from the following Description of the Preferred Embodiments when read in conjunction with the accompanying drawings in which:

FIG. 4 is an exemplary view of an output provided in accordance with an aspect of the method of the invention;

FIG. 5 is another exemplary view of an output provided in accordance with an aspect of the method of the invention;

FIG. 7 is another exemplary view of an output provided in accordance with an aspect of the method of the invention;

FIG. 8a is another exemplary view of an output provided in accordance with an aspect of the method of the invention;

FIG. 8b is another exemplary view of an output provided in accordance with an aspect of the method of the invention;

FIG. 9 is another exemplary view of an output provided in accordance with an aspect of the method of the invention; and FIG. 10 is another exemplary view of an output provided in accordance with an aspect of the method of the invention.

Similar numerals refer to similar parts to the specification.

DESCRIPTION OF THE PREFERRED EMBODIMENTS

Figure 1:
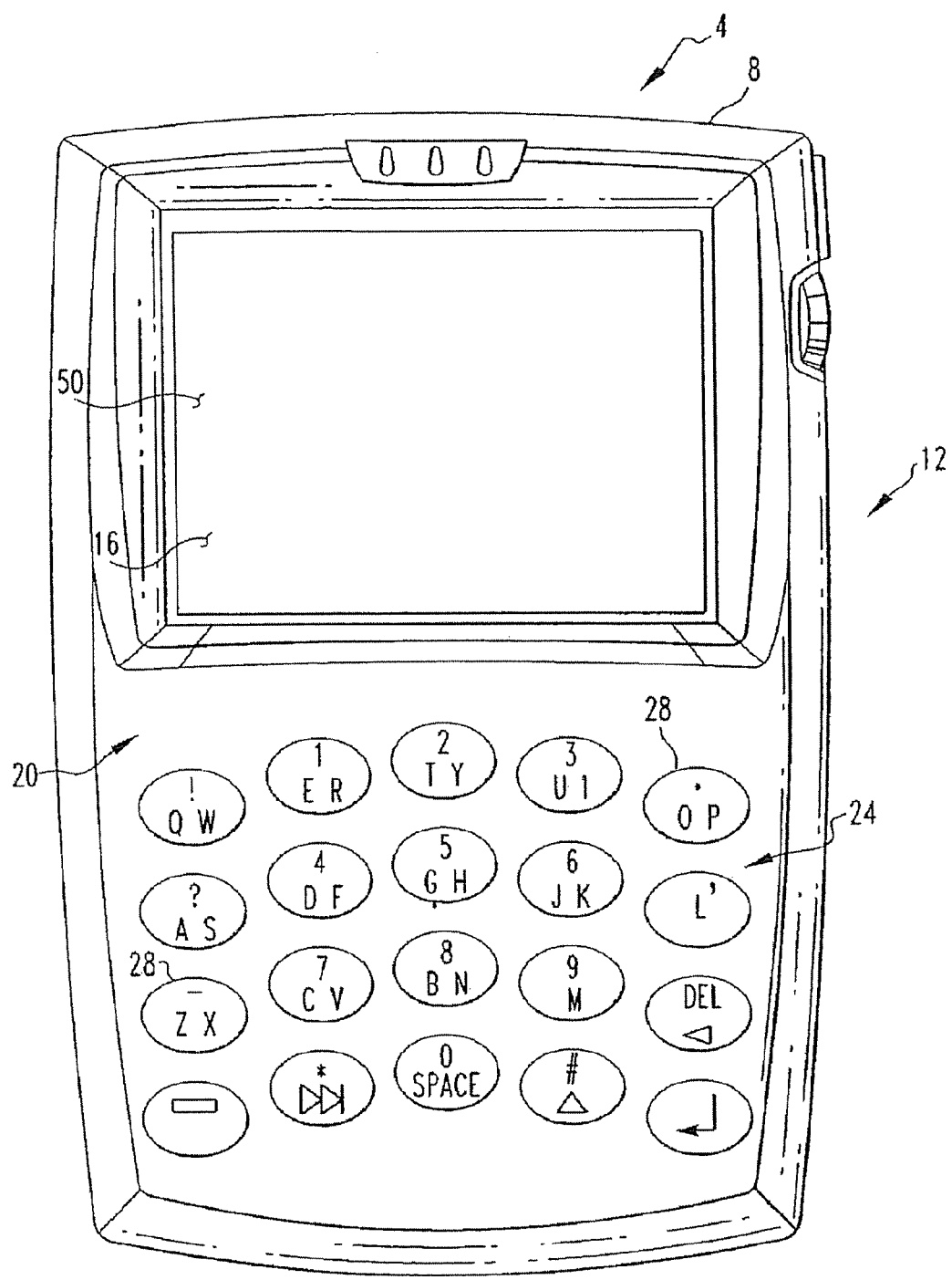
FIG. 1 is an exemplary top plan view of a handheld electronic device in accordance with the invention which can be used in conjunction with an improved method in accordance with the invention.
Figure 2:
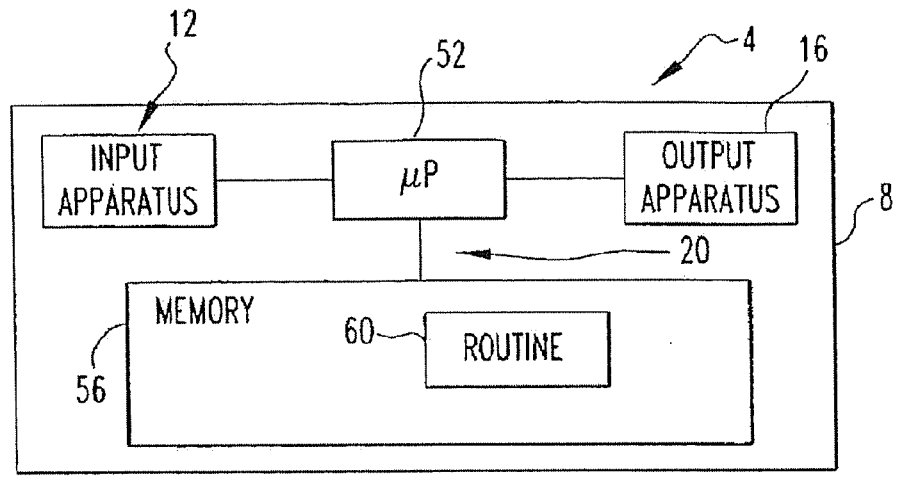
FIG. 2 is a schematic view of the handheld electronic device of FIG. 1.

An improved handheld electronic device 4 in accordance with the invention is indicated generally in FIG. 1 and is depicted schematically in FIG. 2. The exemplary handheld electronic device 4 includes a housing 8 upon which are disposed an input apparatus 12, an output apparatus 16 and a processor apparatus 20. The input apparatus 12 includes a keypad 24 that can be said to include a plurality of keys 28.

The output apparatus 16 includes a display 50. The output apparatus 16 can additionally include, for instance, additional indicators such as lights, and the like, and can additionally include an audible output such as a speaker as well as other output devices.

The processor apparatus 20 includes a processor 52 that can be, for instance, and without limitation, a microprocessor (μP), and it is responsive to inputs from the input apparatus 12 and provides output signals to the output apparatus 16. The processor apparatus 20 further includes a memory 56 that includes a routine 60 stored therein. The exemplary routine 60 is a messaging routine that can provide a messaging capability on the device 4. It is understood that the memory 56 likely includes a number of other routines that are not expressly mentioned herein. As employed herein, the expression "a number of" and variations thereof shall refer broadly to any nonzero quantity including a quantity of one. The processor 52 interfaces with the memory 56, and the routine 60 is executable on the processor 52.

Figure 3:
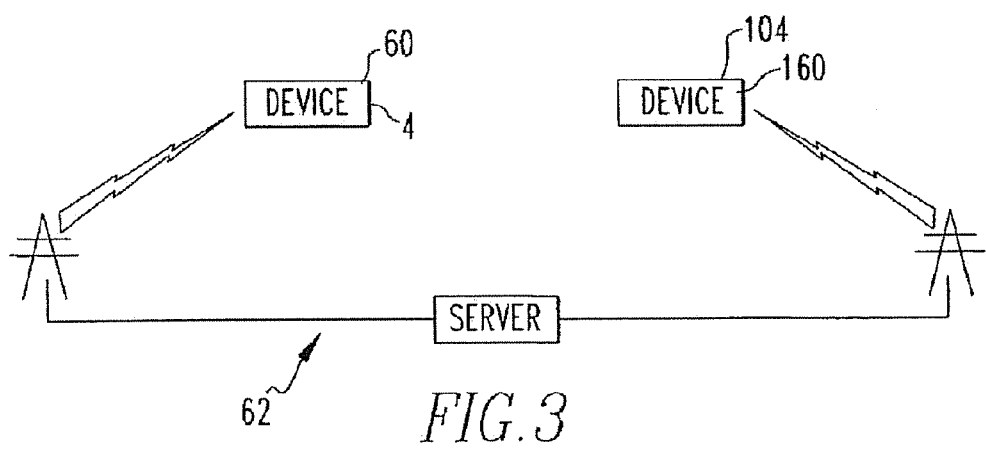
FIG. 3 is a schematic view of the handheld electronic device of FIG. 1 and another device in a messaging environment.

The device 4 further includes a wireless communication system. As can be seen in FIG. 3, the device 4 with the routine 60 can interface with a messaging service 62 to wirelessly provide the messaging capability on the device 4. In the depicted exemplary embodiment, the messaging service 62 provides an instant messaging capability on the device 4 and on the other electronic devices having routines that are subscribers to the messaging service 62. The messaging service 62 is schematically depicted as including a server, although the teachings herein are not limited to messaging services that employ a server. For instance, the messaging service could, for example, provide a point-to-point communication capability such as is provided with the Bluetooth protocol, or may provide some other type of communication capability, whether or not wireless.

FIG. 3 further depicts another device 104 as being a device having a routine that is another subscriber to the messaging service 62. Specifically, the device 104 is an electronic device having a routine 160 thereon which can communicate with the messaging service 62 to provide a messaging capability on the device 104. While the exemplary devices 4 and 104 are depicted as having a wireless connection with the messaging service 62, it is understood that either or both of the devices 4 and 104 may employ a non-wireless communication capability and still not depart from the concept of the invention. It is further understood that while only the two devices 4 and 104 are depicted in FIG. 3 as being subscribers to the messaging service 62, many more subscribers to the messaging service 62 may exist but are not expressly depicted in FIG. 3.

During the course of an electronic conversation, such as depicted in FIG. 4 between, for instance, the devices 4 and 104, a number of messages 68 are communicated between the devices 4 and 104. An incoming message 72 received on, for instance, the device 4, provides a visual indication of a communication that has been transmitted from, for instance, the device 104 to the device 4. As can be seen in FIG. 4, an incoming message 72 includes an incoming symbol 66 and an incoming text portion 70. In the exemplary output depicted herein, the incoming symbol 66 is a mathematical greater than ">" symbol. The text portion 70 is an exemplary linguistic output that could be of numerous types of forms, such as in different languages, and also can include, for instance, symbols and the like that need not necessarily be a part of any particular language.

An outgoing message 76 is depicted as including an outgoing symbol 74, and an outgoing text portion 78. In the exemplary output depicted herein, the outgoing symbol 74 is a mathematical less than "<" symbol. The text portion 78 is an exemplary linguistic output that could be of numerous types of forms.

As can be further seen from FIG. 4, the exemplary conversation depicted therein includes a plurality of incoming messages 72 and a plurality of outgoing messages 76 that are transmitted between the devices 4 and 104 at a conversational speed, i.e., at a speed in which back-to-back communications between the devices 4 and 104 occur without a meaningful delay therebetween. Due to the conversational speed of the back-to-back communications, the messages 68 do not include an indication of the times at which such messages 68 were transmitted, it being assumed as a general matter that in such circumstances the specific time at which a given message within such a conversation occurred may not be of significance to a user.

At a certain point in the exemplary conversation, though, an exemplary message 68 which, for example, may be an outgoing message 76, may also become a non-responded-to message 80, meaning that subsequent to its transmission substantially no additional communication occurs between the device 4 and 104 within a predetermined duration of time. More specifically, as the conversation transpires, the back-to-back incoming messages 72 and outgoing messages 76 are displayed adjacent one another. However, after the expiration of a predetermined duration of time after the transmission of a message 68, for instance ten minutes, in which substantially no additional communication occurs between the device 4 and 104, the message 68 is determined in accordance with the invention to be a non-responded-to message 80, and responsive to such determination a first time stamp 84 is output adjacent the non-responded-to message 80. For instance, if the non-responded-to message 80 was transmitted at 2:44 PM, and if substantially no additional communication between the device 4 and 104 occurs between 2:44 PM and 2:54 PM, at 2:54 PM the first time stamp 84 "2:44 pm" is output to provide to the users of the devices 4 and 104 an indication that the conversation was interrupted at 2:44 PM. Such selective outputting of the first time stamp 84 generally only in response to a message 68 of some significance, such as the terminal message of a conversation, saves space on the display 50. It is noted that the display of the first time stamp 84 typically will occur on both the device 4 and the device 104.

It is understood, however, that the time duration of ten minutes is completely exemplary and that the time duration could be set at any duration. It is also understood that the first time stamp 84 can be output in response to the occurrence of additional and/or other predetermined events. Moreover, it is noted that the predetermined time duration may be variable depending upon the characteristics of the conversation. For instance, if messages are being exchanged on a more infrequent basis, such as every nine minutes, the predetermined duration of time after which the first time stamp 84 is output may be adjusted to be twenty minutes, for example.

By way of further example, and as is depicted generally in FIG. 5, another message 68 may subsequently be communicated between the devices 4 and 104. Since the message 68 corresponds with a resumption of communication between the devices 4 and 104 after a period of interruption, the message 68 is determined to be a resumption message 88, and a second time stamp 92 is output adjacent the resumption message 88. A user thus can determine from the output on the display 50 the period of time during which the conversation was suspended, i.e., the time between transmission of the non-responded-to message 80 and transmission of the resumption message 88. Selective outputting of the second time stamp 92 saves space on the display 50. In this depicted example, the first time stamp 84 is disposed, for example, adjacent the non-responded-to message 80, and the second time stamp 92 is disposed, for example, adjacent the resumption message 88. It is also noted that the second time stamp 92 is disposed, for example, between the non-responded-to message 80 and the resumption message 88.

Figure 6A:
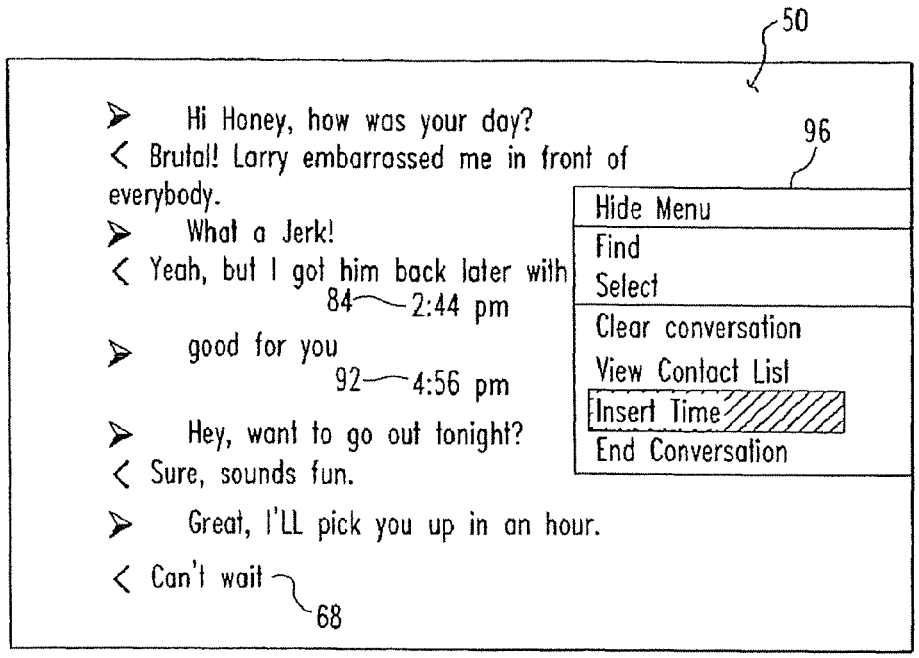
FIG. 6a is another exemplary view of an output provided in accordance with an aspect of the method of the invention.
Figure 6B:
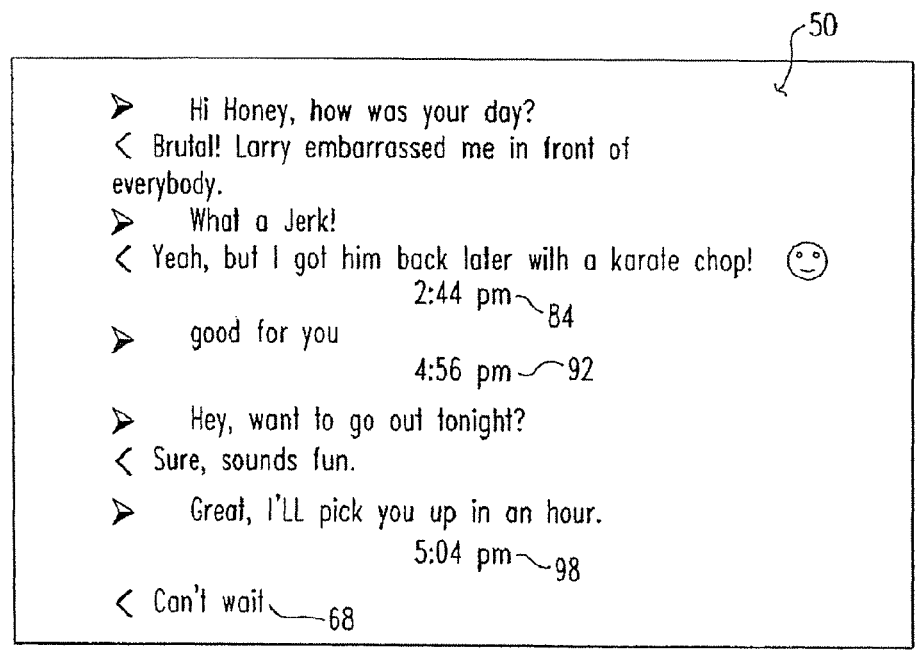
FIG. 6b is another exemplary view of an output provided in accordance with an aspect of the method of the invention.

As the conversation continues after transmission of the resumption message 88, one of the users of the devices 4 and 104 may determine that a time stamp would desirably be displayed in association with a message 68, such as if the user wished to emphasize to himself or herself, or to the other user, the time at which the message 68 was transmitted. If such a time stamp is desired, the user may activate a user interface 96, such as the exemplary user interface 96 of FIG. 6a, which can manually cause the output of an inserted time stamp 98 adjacent the message 68, as in FIG. 6b. As mentioned above, the inserted time stamp 98 can be made to appear on both the device 4 and the device 104, and it is also noted that, if desired, the inserted time stamp 98 could be made to appear on only one or the other of the devices 4 and 104.

As can be seen in FIG. 7, the output could provide a non-responded-to message 180 and a resumption message 188, with a first time stamp 184 being disposed adjacent the non-responded-to message 180, and with a second time stamp 192 being disposed adjacent the resumption message 188. However, in the exemplary output of FIG. 7 the first time stamp 184 and the second time stamp 192 are disposed adjacent one another and are both disposed between the non-responded-to message 180 and the resumption message 188. Such an exemplary display of the first and second time stamps 184 and 192 illustrates the gap in the conversation that occurred between transmission of the non-responded-to message 180 and transmission of the resumption message 188. It is noted that the first time stamp 184 and the second time stamp 192 may have been generated in a fashion similar to the generation of the first time stamp 84 and the second time stamp 92.

As can be seen in FIGS. 8a and 8b, the time stamps can be output in other places. For instance, a text portion of a non-responded-to message 280 may have a beginning 282 and an ending 286. Similarly, a text portion of a resumption message 288 may have a beginning 290 and an ending 294. In accordance with another aspect of the invention, a first time stamp 284 can be output at either the beginning 282 or the ending 286 of the text portion of the non-responded-to message 280, and in the example of FIG. 8a the exemplary first time stamp 284 is output at the beginning 282. Also, a second time stamp 292 can be output at either the beginning 290 or the ending 294 of the text portion of the resumption message 288, and in the example of FIG. 8a the exemplary second time stamp 292 is output at the beginning 290. Other positioning of the first time stamp 284 and the second time stamp 292 are possible within the concept of the invention.

For instance, and as another example, FIG. 8b depicts the exemplary first time stamp 284 as being output at the ending 286 while the exemplary second time stamp 292 is output at the beginning 290. FIGS. 8a and 8b depict different exemplary ways in which the first and second time stamps 284 and 292 can be output to provide time data to a user. In FIG. 8a the first and second time stamps 284 and 292 are disposed at a consistent location, i.e., at the beginnings 282 and 290 of the text portions of the non-responded-to message 280 and the resumption message 288. FIG. 8b disposes the first and second time stamps 284 and 292 generally between the ending 286 of the non-responded-to message 280 and the beginning 290 of the resumption message 288, which focuses the attention of the user on the interval during which the conversation was interrupted. Other ways of outputting the first and second time stamps 284 and 292 will be apparent.

Another way of providing time stamps in a fashion that saves space on the display 50 is depicted in FIG. 9. Specifically, the messages 368 are output without displayed time stamps, but upon moving a cursor 374 or other pointing device or other device in proximity to a given message 368 a corresponding requested time stamp is output adjacent the message 368. In this way, the messages 368 can be provided without also displaying time stamps, but if a time stamp is desired as to any of the messages 368 a requested time stamp 378 can be readily output. In this regard, the requested time stamp 378 may be output for only a predetermined duration of time, for instance a few seconds, and/or the requested time stamp 378 may be deleted from the display 50 upon a detection of another input, such as from the input apparatus 12 or otherwise. In this regard, all of the messages 368 can have time stamps associated therewith that are not displayed until requested.

It is also noted that the requested time stamp 378 need not be requested by the cursor 374, and rather could be requested with virtually any other type of input desired, such as with a stylus and a touch sensitive screen, by an actuation of a key, or by the use of alternate pointing or other devices. Other ways of managing the output of the requested time stamp 378 as to any of the messages 368 will be apparent.

It is noted that the appearances of the various time stamps herein is completely exemplary, and that the time stamps could be provided in any format without departing from the concept of the invention. In this regard, and in accordance with another aspect of the invention, a given time stamp may be a smart time stamp and provide additional information depending upon the prevailing circumstances. For instance, if the first time stamp 84 of FIG. 4 was output as indicated above, and if the conversation was not resumed until the following day, the first time stamp 84 potentially could be configured to automatically change from being displayed as "2:44 pm" on the day of communication of the non-responded-to message 80 to being displayed as, for instance, "2:44 pm Thursday" or, for instance, "2:44 PM Sep. 17, 2004" or, for instance, "2:44 pm yesterday" on the following day, although other configurations will be apparent and will be within the concept of the invention.

Further in this regard, the time stamps can be configured to depict relative times, i.e., elapsed times, rather than absolute times. For instance, and as is depicted generally in FIG. 10, a time stamp 478 associated with a message 468 can be output to say, for example, "less than one minute ago", meaning that the message 468 that has been activated by the cursor 474 has been transmitted less than one minute prior to the current time.

Such a time stamp 478 could be configured to be an active time stamp, meaning that it would change as time progressed. For instance, the time stamp 478 could progressively change from saying "less than one minute ago" to saying "one minute ago", "two minutes ago", "forty-five minutes ago", and the like as time progressed. Such a time stamp also could be configured, for instance, to revert back to displaying an absolute time after the expiration of a given time duration. For example, once the message 468 is one hour old, for instance, the time stamp 478 might be configured to no longer output a relative time such as "fifty-nine minutes ago", and rather to output an absolute time such as "2:54 pm". Other variations can be provided without departing from the concept of the invention.

If it is desired to provide such time stamps that output relative times, it might also be desirable to output such time stamps in any of the fashions set forth above, and such time stamps potentially could be configured to be output without first detecting a delay or a break in the "conversation". For instance, the time stamp "less than a minute ago" could be displayed immediately upon receiving a message on the handheld electronic device 4, if such a configuration is desired. In such a configuration, and in order to save space on the display 50, the handheld electronic device 4 may be configured to provide such a relative time stamp only for the most recently transmitted message. That is, responsive to detecting the transmission of a message, the handheld electronic device may be configured to substantially immediately output a time stamp such as "less than a minute ago". After one minute the time stamp may be altered to say "one minute ago", and the like. However, upon the transmission of an additional message, the time stamp for the prior message can be deleted and a new time stamp such as "less than a minute ago" can be provided with respect to the new message.

Such relative time stamps provide to the user an expedited understanding of the timing aspects of the message. That is, the user can understand an aspect of the time of transmission without having to refer to the current time. This advantageously saves effort by the user because it eliminates the mental step of determining the current time and subtracting therefrom an absolute time displayed by a time stamp to determine the elapsed time since transmission of the message.

The different fashions of selectively providing intelligent time data in the form of selectively output time stamps advantageously saves valuable space on the display 50. Moreover, such selective outputting of time stamps advantageously avoids unnecessary visual clutter on the display 50.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

The invention claimed is:

1. A method of displaying an instant message conversation on an electronic device, the instant message conversation comprising a plurality of instant messages exchanged between the electronic device and a second electronic device, the method comprising:
   determining that a first instant message has occurred at a first time between the electronic device and the second electronic device;
   displaying at least a portion of the first instant message;
   determining that a second instant message has occurred at a second time between the electronic device and the second electronic device;
   displaying at least a portion of the second instant message;
   refraining from displaying a time stamp representative of the second time if an amount of time that has elapsed between the first time and the second time is less than a predetermined duration of time.

2. The method of claim 1, further comprising displaying a time stamp representative of the first time.

3. The method of claim 1, wherein the first instant message corresponds to a latest communication in the instant messaging conversation between the electronic device and the second electronic device.

4. The method of claim 1, further comprising displaying a time stamp representative of the second time if the amount of time that has lapsed is greater than or equal to the predetermined duration of time.

5. The method of claim 4, wherein the time stamp representative of the second time is disposed adjacent to the second instant message.

6. The method of claim 4, wherein the time stamp representative of the second time is disposed between the first instant message and the second instant message.

7. The method of claim 4, wherein displaying the time stamp representative of the second time comprises displaying the time stamp representative of the second time as a relative time.

8. The method of claim 7, wherein the time stamp representative of the second time is an active time stamp which changes to reflect a progression of time.

9. The method of claim 7, further comprising displaying the time stamp representative of the second time as an absolute time if a second predetermined duration of time has lapsed since the second time.

10. The method of claim 4, further comprising displaying at least one of the time stamp representative of the first time and the time stamp representative of the second time as a time of day and a date.

11. The method of claim 4, further comprising:
detecting a change in date; and
responsive to detecting the change in date, displaying at least one of the time stamp representative of the first time and the time stamp representative of the second time as a time of day and a date.

12. The method of claim 1, wherein the first instant message is a non-responded to message.

13. The method of claim 1, wherein the second instant message is a resumption message.

14. The method of claim 1, wherein the plurality of instant messages between the electronic device and the second electronic device comprises a plurality of incoming messages and a plurality of outgoing messages.

15. The method of claim 14, wherein each incoming message comprises an incoming symbol and an incoming text portion.

16. The method of claim 14, wherein each outgoing message comprises an outgoing symbol and an outgoing text portion.

17. An electronic device for displaying an instant message conversation, the instant message conversation comprising a plurality of instant messages exchanged between the electronic device and a second electronic device, the electronic device comprising:
a display;
a memory; and
a processor electronically coupled with the display and the memory, the processor configured to:
determine that a first instant message has occurred at a first time between the electronic device and the second electronic device;
output upon the display at least a portion of the first instant message;
determine that a second instant message has occurred at a second time between the electronic device and the second electronic device;
output upon the display at least a portion of the second instant message; and
refrain from displaying a time stamp representative of the second time if an amount of time that has elapsed between the first time and the second time is less than a predetermined duration of time.

18. The electronic device of claim 17, wherein the processor is further configured to display a time stamp representative of the first time.

19. The electronic device of claim 17, wherein the first instant message corresponds to a latest communication in the instant messaging conversation between the electronic device and the second electronic device.

20. The electronic device of claim 17, wherein the processor is further configured to display a time stamp representative of the second time if the amount of time that has lapsed is greater than or equal to the predetermined duration of time.

21. The electronic device of claim 20, wherein the time stamp representative of the second time is disposed adjacent to the second instant message.

22. The electronic device of claim 20, wherein the time stamp representative of the second time is disposed between the first instant message and the second instant message.

23. The electronic device of claim 20, wherein displaying the time stamp representative of the second time comprises displaying the time stamp representative of the second time as a relative time.

24. The electronic device of claim 23, wherein the time stamp representative of the second time is an active time stamp which changes to reflect a progression of time.

25. The electronic device of claim 23, wherein the processor is further configured to display the time stamp representative of the second time as an absolute time if a second predetermined duration of time has lapsed since the second time.

26. The electronic device of claim 20, wherein the processor is further configured to display at least one of the time stamp representative of the first time and the time stamp representative of the second time as a time of day and a date.

27. The electronic device of claim 20, wherein the processor is further configured to:
detect a change in date; and
responsive to detecting the change in date, display at least one of the time stamp representative of the first time and the time stamp representative of the second time as a time of day and a date.

28. The electronic device of claim 27, wherein the first instant message is a non-responded to message.

29. The electronic device of claim 27, wherein the second instant message is a resumption message.

30. The electronic device of claim 27, wherein the plurality of instant messages between the electronic device and the second electronic device comprises a plurality of incoming messages and a plurality of outgoing messages.

31. The electronic device of claim 30, wherein each incoming message comprises an incoming symbol and an incoming text portion.

32. The electronic device of claim 30, wherein each outgoing message comprises an outgoing symbol and an outgoing text portion.

33. A non-transitory computer readable medium comprising computer executable instructions embedded thereon for execution by a processor of an electronic device for displaying an instant message conversation upon a display of the electronic device, the instant message conversation comprising a plurality of instant messages exchanged between the electronic device and a second electronic device, such that when executed, the processor:

determines that a first instant message has occurred at a first time between the electronic device and the second electronic device;

outputs at least a portion of the first instant message upon the display;

determines that a second instant message has occurred at a second time between the electronic device and the second electronic device;

outputs at least a portion of the second instant message upon the display; and refrains from displaying a time stamp representative of the second time if an amount of time that has elapsed between the first time and the second time is less than a predetermined duration of time.

34. The non-transitory computer readable medium of claim 33, further comprising computer instructions such that when executed cause the processor to display a time stamp representative of the first time.

35. The non-transitory computer readable medium of claim 33, wherein the first instant message corresponds to a latest communication in the instant messaging conversation between the electronic device and the second electronic device.

36. The non-transitory computer readable medium of claim 33, further comprising computer instructions such that when executed cause the processor to display a time stamp representative of the second time if the amount of time that has lapsed is greater than or equal to the predetermined duration of time.

37. The non-transitory computer readable medium of claim 36, wherein the time stamp representative of the second time is disposed adjacent to the second instant message.

38. The non-transitory computer readable medium of claim 36, wherein the time stamp representative of the second time is disposed between the first message and the second instant message.

39. The non-transitory computer readable medium of claim 36, wherein displaying the time stamp representative of the second time comprises displaying the time stamp representative of the second time as a relative time.

40. The non-transitory computer readable medium of claim 39, wherein the time stamp representative of the second time is an active time stamp which changes to reflect a progression of time.

41. The non-transitory computer readable medium of claim 39, further comprising computer instructions such that when executed cause the processor to display the time stamp representative of the second time as an absolute time if a second predetermined duration of time has lapsed since the second time.

42. The non-transitory computer readable medium of claim 36, further comprising computer instructions such that when executed cause the processor to display at least one of the time stamp representative of the first time and the time stamp representative of the second time as a time of day and a date.

43. The non-transitory computer readable medium of claim 36, further comprising computer instructions such that when executed cause the processor to:

detect a change in date; and responsive to detecting the change in date, display at least one of the time stamp representative of the first time and the time stamp representative of the second time as a time of day and a date.

44. The non-transitory computer readable medium of claim 33, wherein the first instant message is a non-responded to message.

45. The non-transitory computer readable medium of claim 33, wherein the second instant message is a resumption message.

46. The non-transitory computer readable medium of claim 33, wherein the plurality of instant messages between the electronic device and the second electronic device comprises a plurality of incoming messages and a plurality of outgoing messages.

47. The non-transitory computer readable medium of claim 46, wherein each incoming message comprises an incoming symbol and an incoming text portion.

48. The non-transitory computer readable medium of claim 46 wherein each outgoing message comprises an outgoing symbol and an outgoing text portion.

49. A method of displaying an instant message conversation on an electronic device, the instant message conversation comprising a plurality of instant messages exchanged between the electronic device and a second electronic device, the method comprising:

displaying the plurality of instant messages exchanged between the electronic device and a second electronic device;

associating each instant message of the plurality of instant messages with a corresponding time of communication indicating when the instant message was exchanged; and displaying a time stamp representative of the time of communication for only a most recently exchanged instant message.

50. A non-transitory computer readable medium comprising computer executable instructions embedded thereon for execution by a processor of an electronic device for displaying an instant message conversation on an electronic device, the instant message conversation comprising a plurality of instant messages exchanged between the electronic device and a second electronic device, the computer executable instructions, when executed, cause the processor to:

display the plurality of instant messages exchanged between the electronic device and a second electronic device;

associate each instant message of the plurality of instant messages with a corresponding time of communication indicating when the instant message was exchanged; and display a time stamp representative of the time of communication for only a most recently exchanged instant message.

51. An electronic device for displaying an instant message conversation, the instant message conversation comprising a plurality of instant messages exchanged between the electronic device and a second electronic device, the electronic device comprising:

a display;

a memory; and a processor electronically coupled with the display and the memory, the processor configured to:

display the plurality of instant messages exchanged between the electronic device and a second electronic device;

associate each instant message of the plurality of instant messages with a corresponding time of communication indicating when the instant message was exchanged; and display a time stamp representative of the time of communication for only a most recently exchanged instant message.

\* \* \* \* \*